United States Patent [19]
Moore

[11] Patent Number: 5,412,220
[45] Date of Patent: May 2, 1995

[54] OPTICAL SCANNING DEVICE FOR LUMBER

[75] Inventor: Stuart G. Moore, Lions Bay, Canada

[73] Assignee: United Industrial Products, Ltd., North Vancouver, Canada

[21] Appl. No.: 26,768

[22] Filed: Mar. 5, 1993

[51] Int. Cl.⁶ .................... G01B 11/02; G01B 11/30
[52] U.S. Cl. .................... 250/563; 198/403; 356/237; 356/430; 144/357
[58] Field of Search .......... 356/237, 430, 431; 250/562, 563; 144/357; 198/403, 404, 733, 734

[56] References Cited

U.S. PATENT DOCUMENTS

| | | | |
|---|---|---|---|
| 3,410,198 | 12/1968 | Lohr et al. | 198/733 |
| 3,887,066 | 6/1975 | Houtsager | 198/403 |
| 3,981,390 | 9/1976 | Richard | 198/733 |
| 4,029,196 | 6/1977 | Ekholm | 198/413 |
| 4,149,089 | 4/1979 | Idelsohn et al. | 250/563 |
| 4,484,675 | 11/1984 | Doherty et al. | 198/413 |
| 4,756,404 | 7/1988 | Maag et al. | 198/733 |
| 4,803,371 | 2/1989 | Durland | 250/560 |
| 4,852,029 | 7/1989 | Pope et al. | 364/556 |
| 4,936,437 | 6/1990 | Gearhart | 198/403 |
| 5,143,197 | 9/1992 | Saver | 198/403 |

FOREIGN PATENT DOCUMENTS 1166334 4/1984 Canada .
1185147 4/1985 Canada .

*Primary Examiner*—Robert P. Limanek
*Assistant Examiner*—David B. Hardy
*Attorney, Agent, or Firm*—Adrian Zahl

[57] ABSTRACT

The present invention relates to an optical scanning device for use in sawmills, to determine the severity and location of surface defects on lumber, for the purpose of grading and trimming, having a plurality of optical scanning means mounted to a frame and positioned above lumber transport means. The scanning means are adapted to scan at least one face of a predetermined segment of each board, and comprise a lens, means to convert an image resolved in the lens into electronic signals and means to transmit said signals to signal processing means adapted to assess surface defects on the board and determine a lumber grade of each board. The device may include means for rotating each board about its longitudinal axis to sequentially expose the longitudinal faces thereof to the scanning means.

26 Claims, 6 Drawing Sheets

FIG. 5
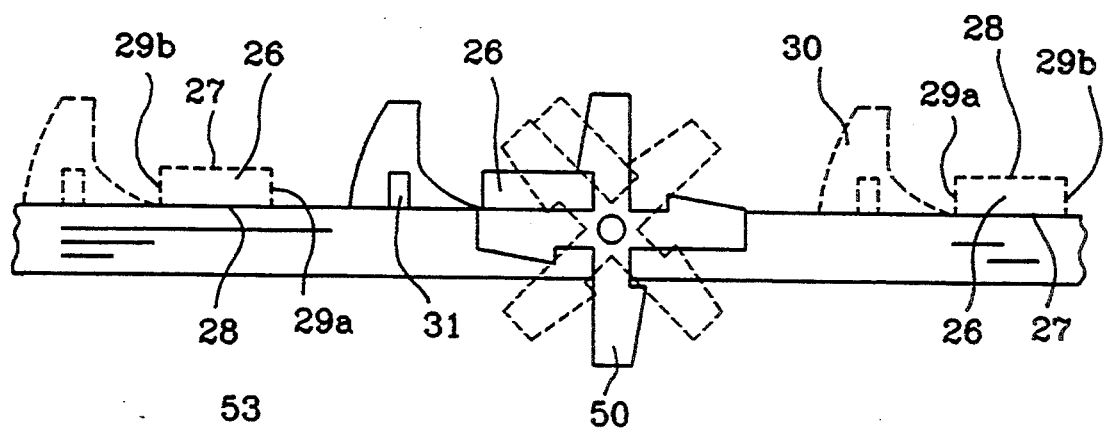
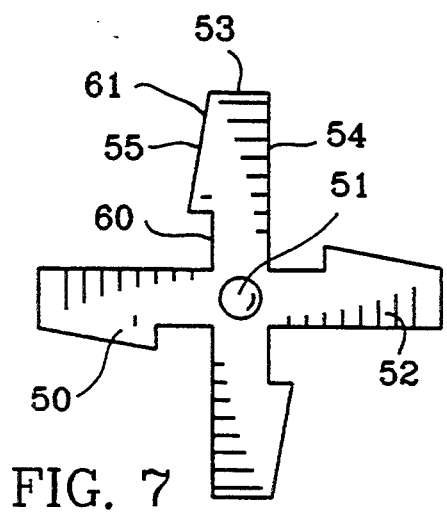
FIG. 7
FIG. 6
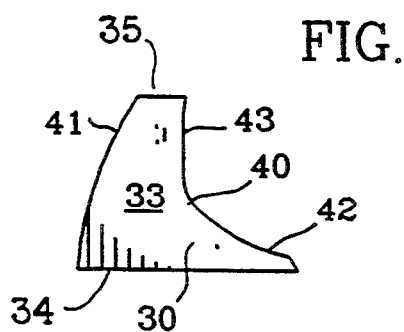
FIG. 8
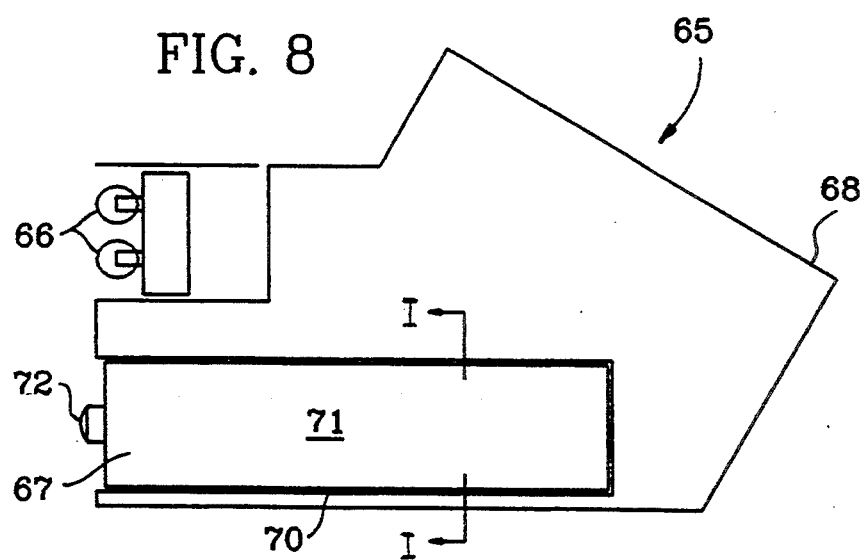

OPTICAL SCANNING DEVICE FOR LUMBER

FIELD OF THE INVENTION

The present invention relates to optical scanning devices for use in sawmills, to determine the severity and location of knots, checks and the like on lumber, for the purpose of grading and trimming.

BACKGROUND OF THE INVENTION

Scanning of sawn lumber is required in order to assess the severity and location of knots, checks and other surface defects in each board passing through a mill. This information determines the grade of each board, and can be used to assess the desirability of trimming the board to increase its grade. Typically, a board is trimmed in two foot increments. The grader must assess whether and how much is to be trimmed from either end of a board, weighing the loss of lumber against the upgrading that can be achieved by removing a portion of the board that bears surface defects. The grade given each board is a function of grading rules determined by an appropriate governing body, and is determined by the presence of surface features such as knots, checks, and the like, their location in the board, e.g., adjacent an end or an edge of the board, and the size, density and general severity of the features.

The grading of lumber is typically performed manually. A mill worker typically picks up one end of a board and scans it for surface features by gazing along its length. The worker estimates the amount that is required (or desirable) to be trimmed from each end of the board, and assesses the resulting lumber grade. A relatively high degree of error occurs in the manual scanning process, from the difficulty of gauging accurately the position of a defect when looking along the length of a board that may be up to 24 feet long, the typical maximum length board processed in a mill. In an attempt to minimize error, lumber graders generally overestimate the amount that is required to be trimmed, especially from the far end of the board, and a significant portion of the lumber is thus wasted. Automation of the grading task is desirable, both to economize on manpower and to minimize error in the scanning process.

It is known to employ optical scanning means for lumber processing for purposes other than grading and trimming. For example, U.S. Pat. No. 4,803,371 (Durland) discloses an optical scanner, intended to resolve the three-dimensional configuration of a rough sawn timber passing through the device, in order to assess the optimal cutting of the timber into finished or semi-finished boards. The device employs a plurality of light sources positioned to illuminate each board passing through the device, and a number of image detectors having overlapping fields of view, positioned above and below the board, adapted to resolv the three dimensional configuration of the board. The device may also be used to assess surface defects on the board. It has heretofore been difficult to achieve automatic scanning of lumber for grading and trimming purposes. It is necessary that all four longitudinal faces of each board be scanned, and this requires either the positioning of scanning devices above and below the level of the boards, or means for rotating each board. The former approach suffers the drawbacks of debris accumulation on the lower scanning devices, and obstruction of the lower scanning devices by the various beams and girders required to support the lumber. The latter approach, selected in the present invention, requires the provision of a simple, rapid and effective means to rotate each board in order to expose all four of its longitudinal faces, and this has not heretofore been achieved. An automatic scanner must achieve accurate, reliable results at the high speeds required in a modern mill. It is desirable to provide a modular system, whereby each scanning device independently scans a segment of the board, in order to allow for a variety of board lengths to be scanned, and to facilitate repairs to the device.

SUMMARY OF THE INVENTION

The invention comprises a lumber inspection device for the detection of surface features on boards, comprising: a frame; lumber transport means supported by the frame; and a plurality of optical scanners mounted to the frame and positioned above the transport means. The scanners are adapted to scan at least one face of a predetermined segment of each board. The scanners each comprise a lens, means to convert an image resolved in the lens into electronic signals and means to transmit the resulting signals to a signal processing means adapted to assess surface defects on the board and determine a lumber grade of each segment.

According to another aspect of the invention, a board-rotator is provided, adapted to rotate each board about its longitudinal axis to sequentially expose the longitudinal faces of the board to the scanning means.

According to another aspect of the invention, the lumber transport means comprises a chain driven along the length of the device by a motor and having a series of board engagement means mounted at regular intervals along its length. Each of the board engagement means comprises an elongate member having a generally concave forward face having a generally horizontal lower part merging with a generally vertical upper part. The board engagement means are adapted to cooperate with the board rotator, to allow each board engaged by the engagement means to be rotated about its longitudinal axis by 180 degrees, to expose all faces of the board to the scanners.

According to another aspect of the invention, the signal processing means are adapted to resolve and recognize surface defects on the board, to conduct threshholding analysis thereon and to indicate the size, shape and surface location of each defect having a size greater than a predetermined minimum.

The invention further comprises a method for inspecting lumber for surface defects, comprising the steps of positioning a board on lumber transport means, scanning a first face of said board by means of a first optical scanner positioned on a frame above the board, rotating the board about its longitudinal axis to sequentially expose the longitudinal faces of the board and scanning a second face of said board with a second optical scanner positioned above the board and mounted on the frame. The first and second scanners are each adapted to scan a predetermined segment of the board and to convert the visual information received thereby into electronic signals. The signals are conveyed to signal processing means adapted to assess the position, size and nature of surface defects on the board, to perform thresholding analysis in respect of the surface defects, to compare said surface features with defect size, type and location rules imposed by predetermined grading rules, and to indicate the grade of the board segment.

It will be understood that the term "light" used herein may refer to any type of electromagnetic radiation suitable for use in a scanning system while the preferred embodiment employs visible light, it will be understood that with modifications, scanners may be employed that operate at any appropriate wavelength.

It will be further understood that references herein to the directional indications "upper", "lower", "forward", "rearward", and the like, are in reference to the normal operating position of the device in a horizontal position, with "forward" and "rearward" being relative to the direction of travel of lumber transported through the device.

BRIEF DESCRIPTION OF THE DRAWINGS

FIG. 5 is a side elevational view of a portion of the device illustrating the board rotating element of the apparatus;

FIG. 6 is a side elevational view of a board engagement lug;

FIG. 7 is a side elevational view of the board rotator element;

FIG. 8 is a side sectional view of the computer vision module portion of the apparatus;

DETAILED DESCRIPTION OF THE PREFERRED EMBODIMENT

A lumber grading device according to the present invention is comprised of a lumber transport means, an optical scanning means and a control and information processing means.

Figure 1:
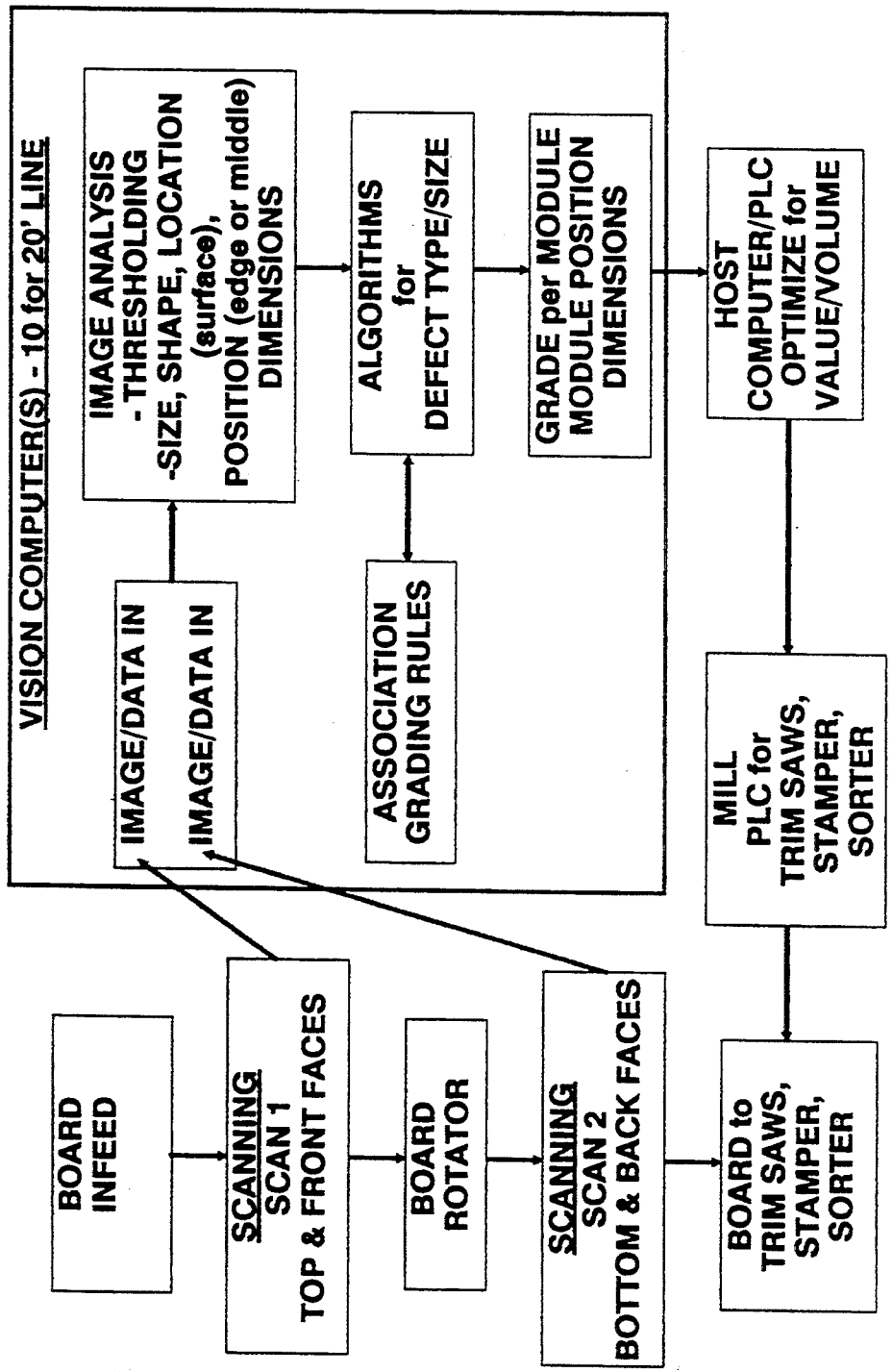
FIG. 1 is a block diagram illustrating the operation of the device.

The general operation of the device is illustrated schematically at FIG. 1. Lumber processed by the device is taken up by rearward end thereof, with the lumber being transported in a transverse position through the device and scanned therein, to a front end of the device. Following infeed into the device, each board receives an initial scan by an array of scanners adapted to segmentally scan the board, of its upper and forward lateral faces. The board is then rotated by 180 degrees, following which its previously unscanned faces, now again the upper and forward lateral faces, are scanned. The board is then delivered from the device to various downstream processing means, including trim saws, sorters and stampers for indicating the grade of the board. The information received from the scanning means is processed in each of the scanning means to assess various aspects of the surface defects detected by the scanning means, and to apply a grade to each board segment scanned by each of the scanning means. The resulting data is transmitted to a host computer, which communicates with and controls the various downstream processing means.

Figure 2:
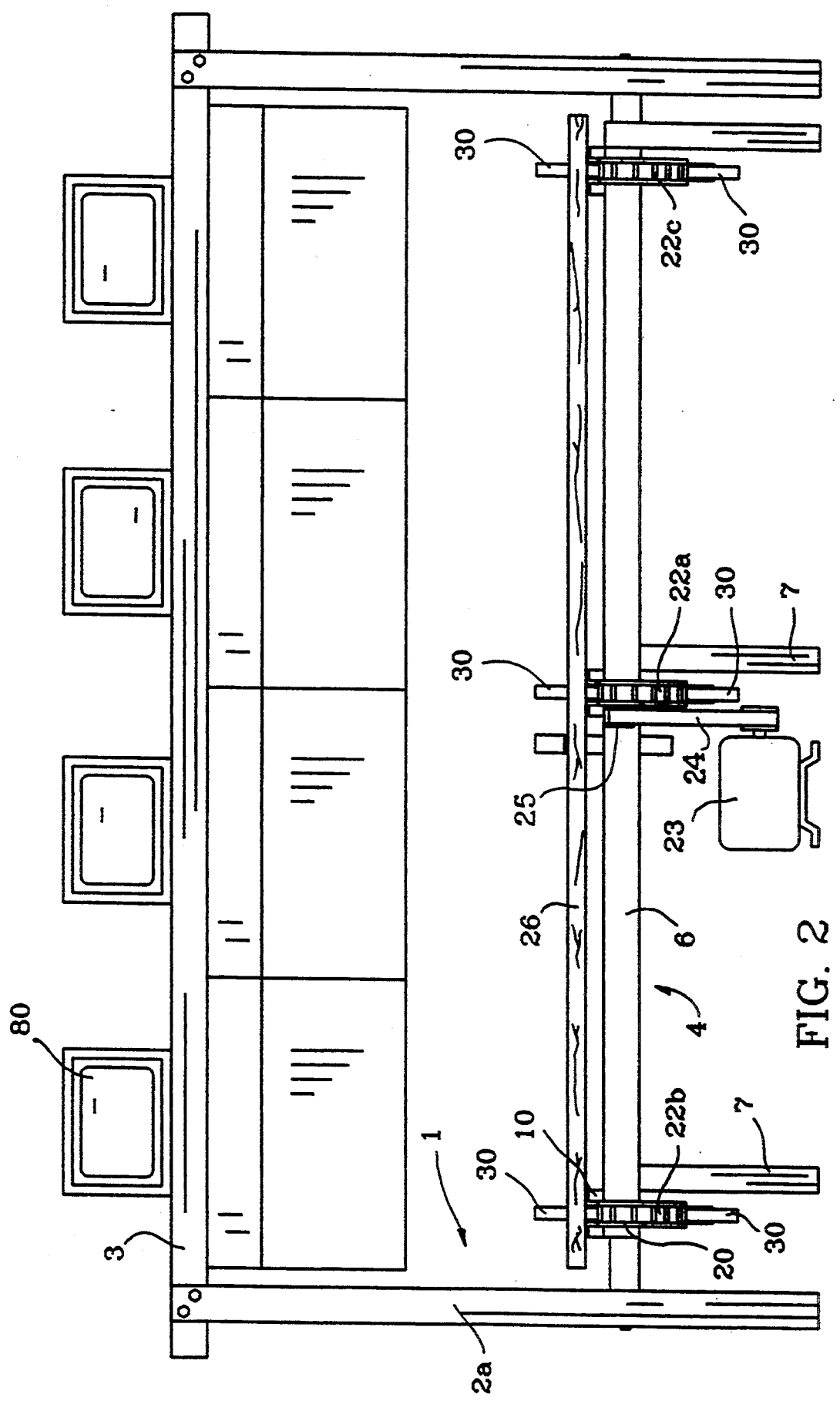
FIG. 2 is a front elevational view of a lumber grading apparatus according to the present invention.
Figure 3:
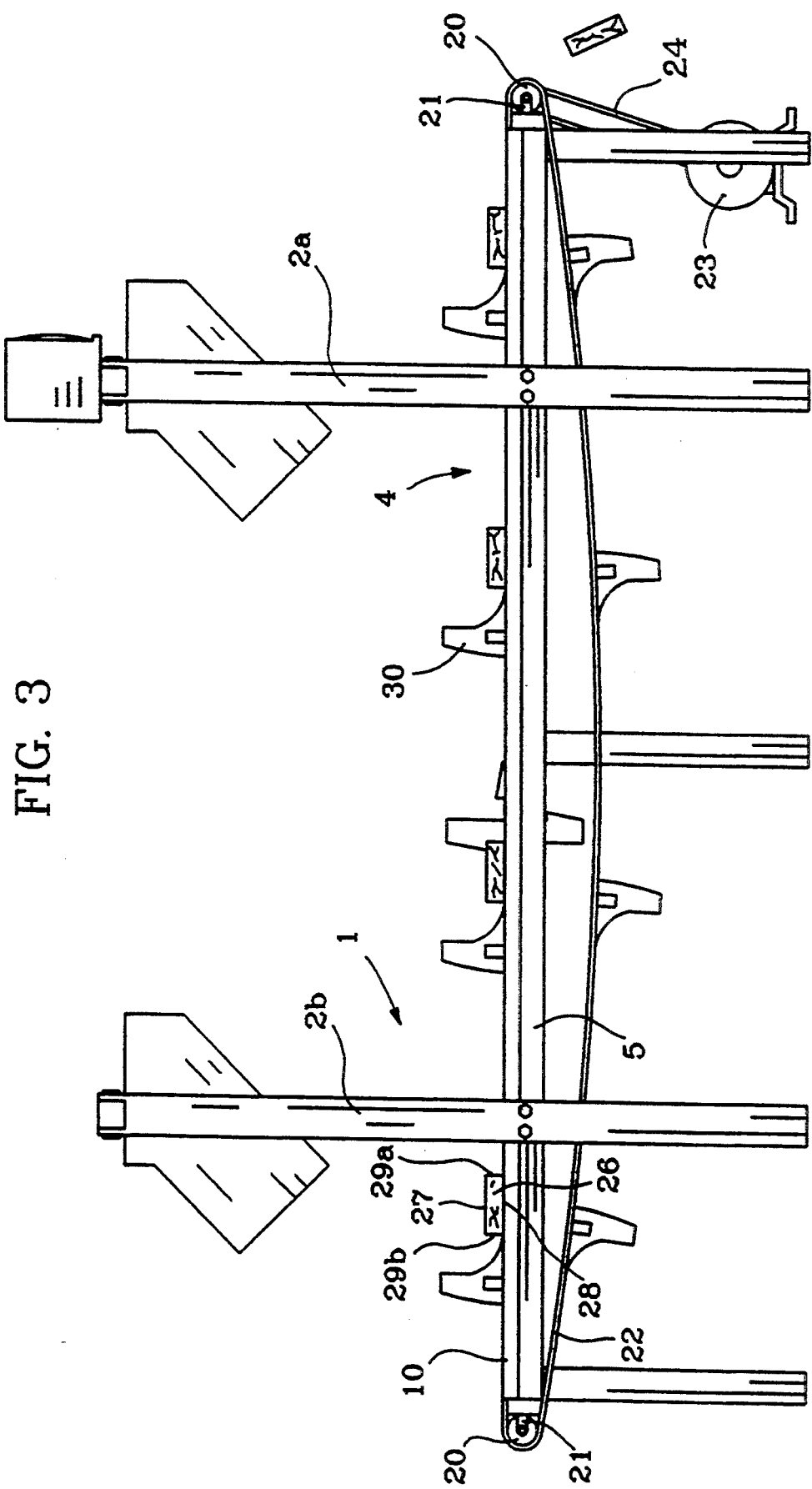
FIG. 3 is a side elevational view of a portion of the apparatus.
Figure 4:
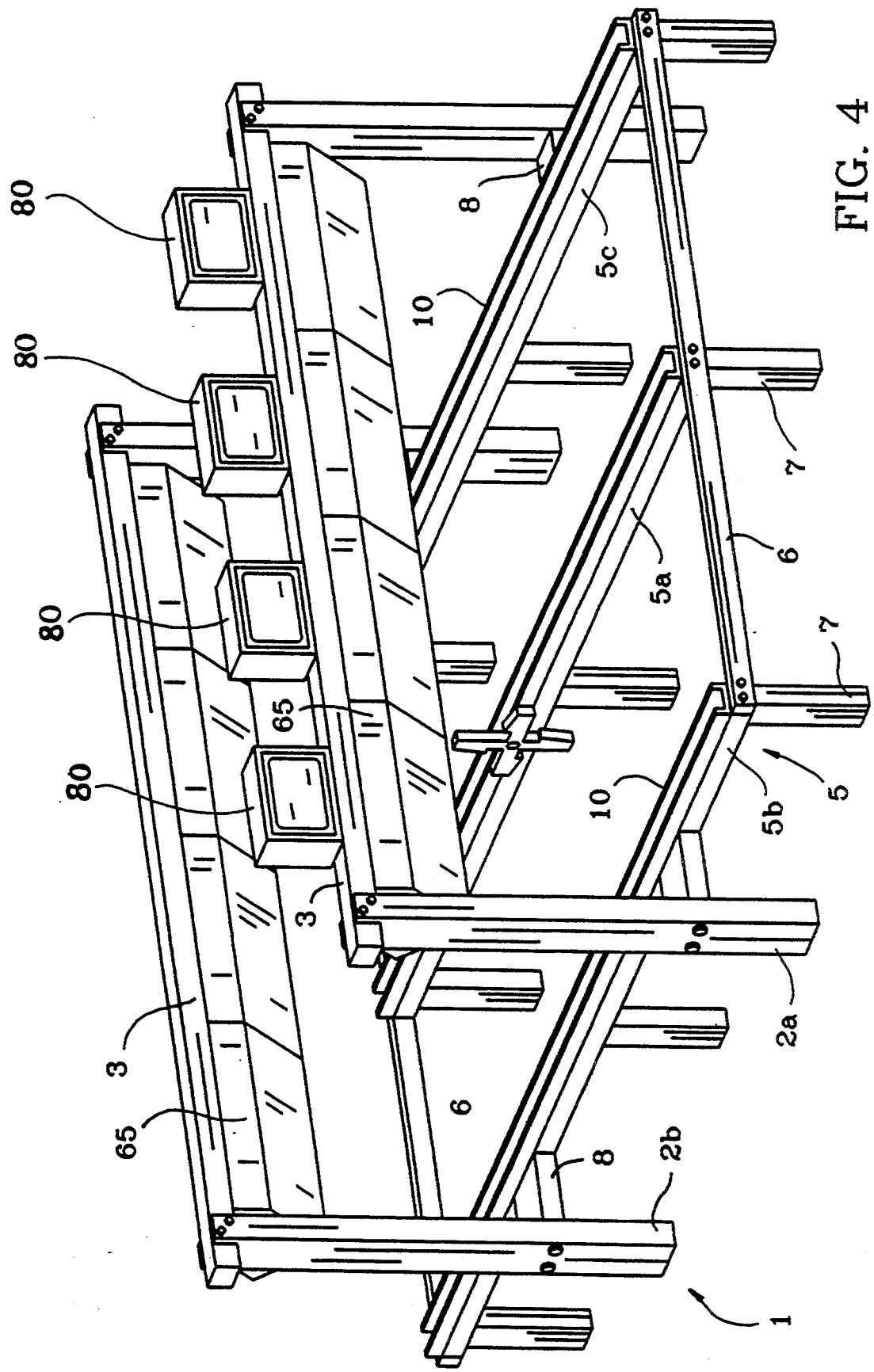
FIG. 4 is a perspective view of the apparatus, with the chain drive portion removed.

Turning to FIGS. 2, 3 and 4, the device is supported by a frame 1, having a pair of forward vertical supports 2(a) and a pair of rearward vertical supports 2(b), each pair being positioned inboard of the ends of the device. A horizontal cross beam 3 links the tops of opposing vertical support members. An elongate grading table 4 extends the length of the device, extending between opposing pairs of vertical support members 2. The grading table comprising a support for the boards as they are scanned and a conveyor to transport the boards from one end of the device to the other end of the device, is comprised of an array of longitudinal beams 5, comprising a central beam 5(a) and lateral beams 5(b) and (c) on either side thereof, linked at their ends to transverse beams 6 and each supported by legs 7. The lateral beams 5(b) and (c) are fixed to the support members 2 by means of links 8.

A chain guide 10, comprising a U-shaped channel, is mounted to the top of each beam 5 and extends the length thereof. The chain guide is fabricated out of ultra high molecular weight nylon, or other abrasion-resistant material having a low friction coefficient.

A chain sprocket 20, shown in FIGS. 2 and 3, is mounted to each end of each longitudinal beam, rotatably engaged to a support bracket 21 that links the sprocket to a corresponding end of a beam 5. Drive chains 22 (a), (b) and (c), respectively, are looped longitudinally around the beams 5 (a), (b) and (c), slideably engaged within each chain guide 10 and are engaged by the chain sprockets 20. The central drive chain 22(b) is driven by an electric motor 23. The motor 23 may be positioned on the floor under the device, as illustrated, or may be suspended from the central beam. The motor is linked to the drive chain 22(b) by means of a belt 24, engaged to a drive sprocket 25 mounted to the central chain sprocket 20 adjacent the motor 23. The speed of the motor is infinitely variable and is controlled by the control and information processing means, described below. The lumber transport means is adapted to transport lumber through the device at speeds of up to 240 boards per minute.

Referreing to FIG. 5, individual boards 26 fed through the device are engaged by an array of lugs 30, each lug being engaged to a corresponding drive chain and extending upwardly therefrom when the chain is positioned within chain guide 10. Each board has an upper face 27, a lower face 28, and forward and rearward lateral faces 29 (a) and (b), respectively. The directional references refer to a board in its initial infeed position, as shown in the the left side of FIG. 5. Each lug is engaged to a corresponding chain by way of a pair of mounting plates 31 positioned on either side of each lug and engaged to a link of the chain. The lugs are spaced at regular intervals of between 18 and 36 inches along the length of each chain, with the chains being positioned within the device such that lugs engaged to the chains 22(a), (b) and (c) describe a series of even rows across the width of the grading table.

Referring to FIG. 6, each lug 30 has generally flat sides 33; a horizontal base 34 and top 35; and leading and trailing faces 40 and 41, respectively. When positioned within the chain guide, the leading face of the lug faces the front of the device. The leading face has a generally concave profile when viewed from the side, with a lower portion 42 sloping upwardly and rearwardly at a relatively shallow angle relative to the base, merging with a slightly curved, generally vertical upper portion 43, having a slight forward lean at its upper end.

The configuration of the forward face is adapted to retain a board driven across the grading table, and to cooperate with a board rotator, described below, to rotate the board about its longitudinal axis. The configuration of the trailing face does not affect the operation of the device.

Referring to FIGS. 5 and 7, board rotators 50 are mounted to at least one of the beams 5, intermediate between the forward and rearward vertical supports 2(a) and 2(b). The board rotators are adapted to rotate each board 26 by 180 degrees about its longitudinal axis, in order to position what was previously the lower face 28 of the board such that it faces upwardly, where the device is adapted for use with longer length boards, longer than 12 feet, two rotators may be provided when shorter length boards are processed, only a single rotator is required. The board rotator 50 comprises a generally planar structure, freely rotatable about a central axis 51 to a beam 5, having four arms 52 extending radially outwardly at right angles from each other. Each arm has a generally flat top 53, a leading face 54 and a trailing face 55, relative to the normal direction of rotation thereof, with the leading face facing the front of the device when the rotating when the arm is extending upright. The leading face 54 is generally flat, and is perpendicular to the longitudinal axis of the adjacent pair of arms. The trailing face has a recessed lower portion 60 and an upper portion 61 that slopes upwardly and rearwardly when viewed with the arm extending upwardly.

As each board is pushed forwardly through the device by the lugs 30, its forward face 29 (a) contacts the recessed portion 60 of an upwardly-extending first arm and is loosely engaged therein. The lower face 28 of the board contacts the leading face 54 of a second adjacent arm. As the board continues its forward movement, driven by the lugs 30, it pivots the rotator about its axis, as shown in the dotted lines in FIG. 5, lifting the board. Continued forward movement of the board causes the rotator to rotate the board by 180 degrees and deposit it on the forward side of the rotator. The sloping configuration of the forward face of the lugs cooperates with the action of the rotator to smoothly rotate each board.

Figure 9:
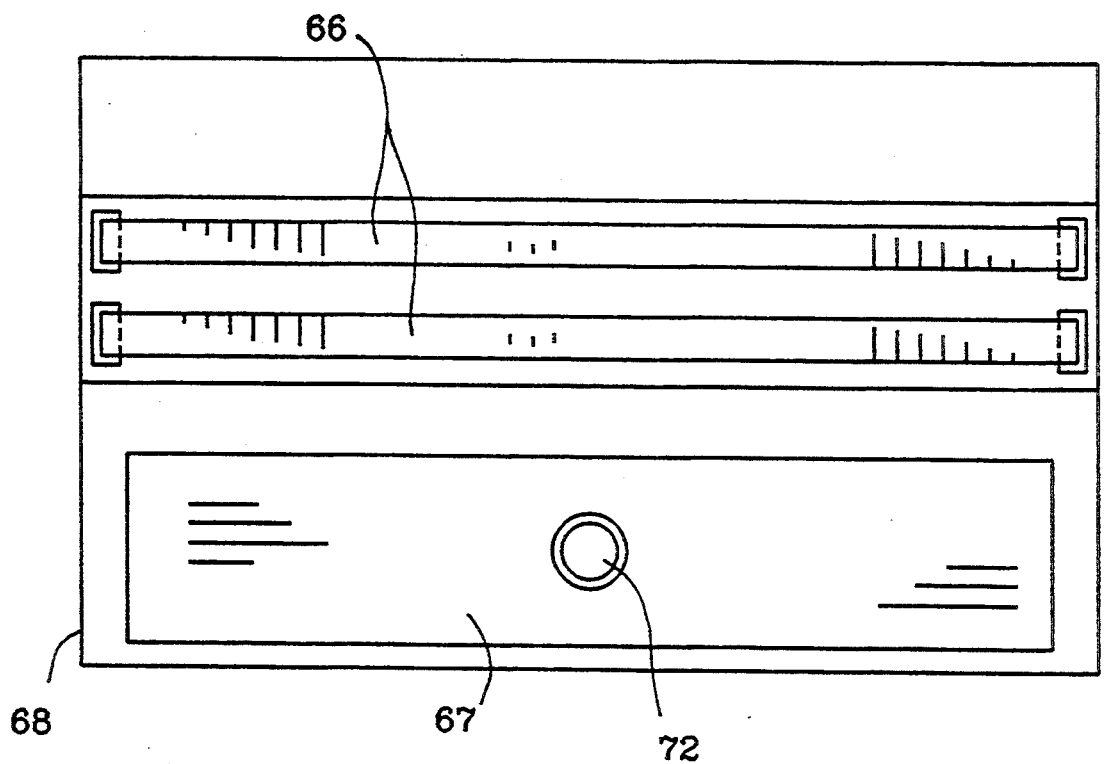
FIG. 9 is a front elevational schematic view of the computer vision module portion of the apparatus.

As seen in FIG. 4, each horizontal cross beam 3 supports a row of computer vision modules 65, the forward and rearward beams supporting forward and rearward rows of modules, respectively. Each module 65 is suspended from the underside of a corresponding cross beam. Each module, illustrated at FIGS. 8 and 9, is provided with a light source 66, comprising a pair of florescent tubes adapted to emit visible light, and an optical scanner 67 adapted to operate in visible light, mounted within a housing 68. In the example illustrated, the device is provided with a row of four modules suspended from each cross beam, with each housing having a width of 24 inches. The device may, with appropriate modifications, be adapted to support any number of modules from each beam. Each module is adapted to direct a scanner and light source downwardly and rearwardly, in order that the upper and forward faces of each advancing board may be scanned as it is transported through the device. The rearward row of modules scans the upper and forward faces 27 and 29(a) of each board, with the entire length of each board being scanned segmentally be the array of scanners within the row. Subsequently to the scanning thereof by the rearward modules, the board is rotated 180 degrees by means of the board rotator, and the previously unscanned faces, comprising what where previously the lower and rearward faces 28 and 29(b) and now comprising the upper and forward faces of the board, are scanned by the forward array of modules.

Each scanner 67 is adapted to scan a board segment having the same length as the width of the module. The scanner is an adaptation of a typical commercial scanner. The scanner comprises a case 70 housing a computer 71, which may comprise an IBM (TM) compatible computer, having as its CPU an INTEL 486 (TM) chip. A fixed-focus lens 72 extends from the case, and image conversion means, not shown, convert images received by the lens into electronic signals readable by the computer, the signals being relayed to the computer.

Each computer 71 is programmed to receive the signals relayed thereto by the image conversion means, and to serially analyze the shape, size and position of surface defects and the cross-sectional dimensions of each board segment viewed by the lens. The analysis performed by the computer comprises an initial step of performing a threshholding analysis, wherein surface defects of each given type, e.g., knots, checks, etc., are analyzed as to type and size thereof, with features falling below a certain size being eliminated from further analysis. The information relating to the size, shape and position of each surface defect is analyzed by an algorithm that compares the surface defects within the segment with the defect size and type restrictions imposed by the operative Grading Rules, and assesses a grade for the segment. The computer transmits this information, along with an indication of the cross-sectional board dimensions and a signal indicating the module position, to a host computer housed within the central control unit.

Figure 10:
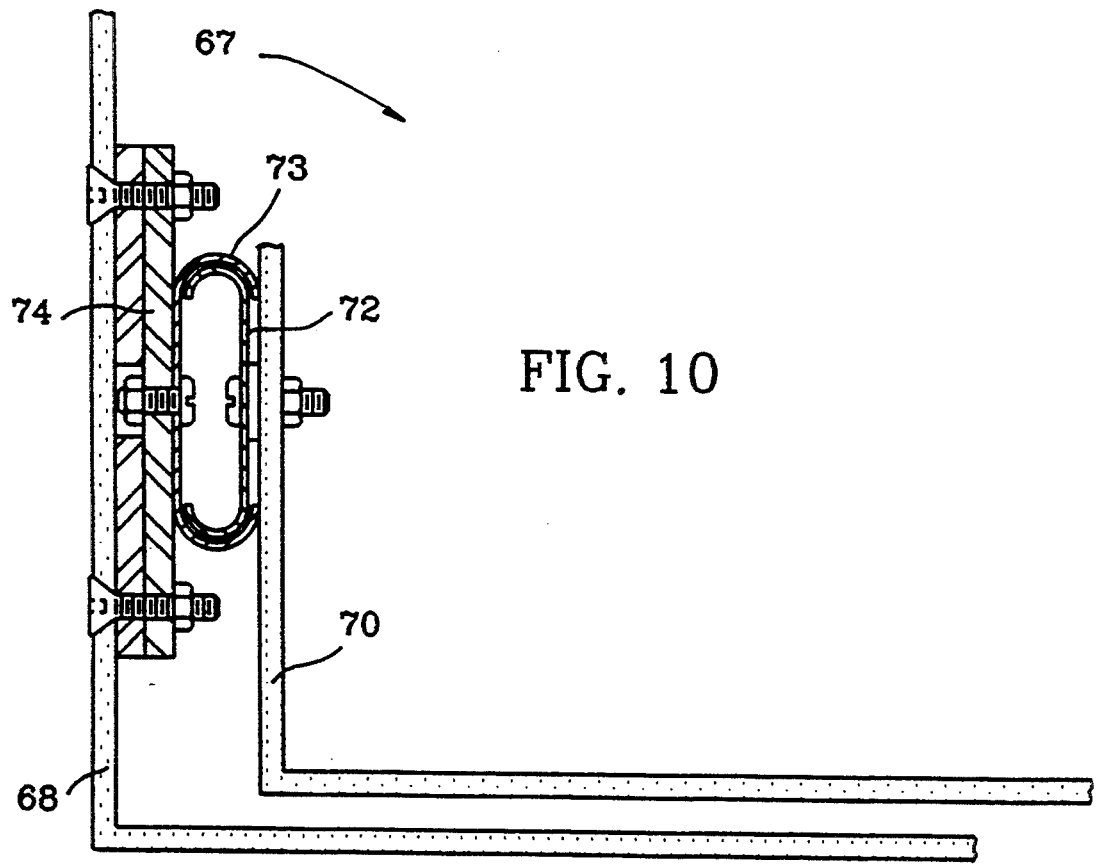
FIG. 10 is a front sectional view of a portion of the computer vision module, along line a—a of FIG. 8.

Referring to FIG. 10, the case 70 of the scanner 67 is slideably engaged to the housing 68, to permit the rapid removal and replacement thereof in the event of a breakdown. The scanner case 70 is provided with a longitudinally-mounted rail 72 on each side face thereof, adapted to mate with a corresponding rail 73 mounted along each side of the inside of the module housing, by way of mounting plates 74 fixed to the inside side faces of the housing. Sliding contacts, not shown, can be employed to provide the interconnect between the scanner and the signal relay cables, not shown, that relay the signals from the scanner to the central information processing unit.

An array of computer screens 80, shown in FIG. 4, are mounted to the top of each cross beam 3, each screen linked to a corresponding module. The screens are adapted to display the images received by each of the scanners, with each screen thereby displaying a segment of the top and forward faces of the board being scanned.

The information processing and control unit, the operation of which is illustrated schematically in FIG. 1, comprises a host computer linked to control means. The control unit is linked to the scanners by means of signal relays, and is adapted to receive and process the information relayed thereto from the scanners, to transmit information to saws and other downstream lumber handling devices, and to allow an operator to control the operation of the device. The host computer is programmed to synthesize the information received from the modules, and determine the optimum grade of each board, indicating whether the board should be trimmed, and to what extent, in order to increase the grade thereof, for example if surface defects are present adjacent an end thereof. The computer determines the grade of the resulting board, and transmits this information to a data storage and transmission unit within the control unit. The information received by the storage and transmission unit is transmitted to various downstream operations, including trim mills, stampers, and sorters, with each of said operations being programmed thereby to perform the appropriate operations on each board fed thereto. The control unit also has controls linked to the motor and the scanners, enabling an operator to control and view all aspects of the operation of the device, including the speed of the device, and the grade and trim amounts of each board.

It will be obvious to those having ordinary skill in the art that many changes may be made in the details of the preferred embodiments described above, without departing from the spirit and scope of the invention, as defined by the appended claims.

I claim:

1. A lumber inspection device for detecting surface features on boards, said boards each having upper, lower and side longitudinal faces and cross sectional dimensions and at least some of said boards having surface defects on said faces, said defects each having a size, shape and location, said device comprising: a frame; an array of optical scanning means mounted to said frame; lumber transport means comprising a conveyor for conveying said boards, said conveyor adapted to transport boards from a rearward portion of said conveyor to a forward portion of said conveyor, with the upper longitudinal faces of said boards facing upwardly when conveyed along said rearward portion; and board rotation means positioned between said rearward and forward portions of said conveyor, said rotation means adapted to engage each board as said board is conveyed along said conveyor, rotate said board by 180 degrees such that its lower longitudinal face faces upwardly and redeposit said board on said conveyor, wherein the upper, lower and side longitudinal faces are sequentially exposed to said optical scanning means wherein said optical scanning means are positioned above said conveyor, and wherein said scanning means are adapted to scan a predetermined segment of each board each of said segments having a position within said board, said scanning means comprising a lens and signal processing means to convert an image resolved in said lens into electronic signals and assess surface defects on the board and transmit said information to a central processing unit to determine a lumber grade of each board.

2. A lumber transport device as claimed in claim 1 wherein said board rotation means comprises a pivot mount rotatably mounted to said frame and having arms extending radially outward from said pivot mount, each arm being adapted to releaseably engage a board as said board is transported through said frame and rotate said board.

3. A lumber inspection device as claimed in claim 2 wherein said arm of said board rotation means includes a recessed portion adapted to receive and releasably retain a lower face of said board.

4. A lumber inspection device as claimed in claim 3 wherein said board rotation means comprises first and second arms, each of which is provided with a leading face and a trailing face, said recessed portion being positioned within said trailing face, wherein said board is adapted to be engaged by said recessed portion of said first arm and the leading face of said second arm.

5. A lumber inspection device as claimed in claims 2, 3 or 4 wherein said board rotation means is further provided with third and fourth arms, and wherein said first, second, third and fourth arms are each provided with a leading face and a trailing face, said recessed portion being positioned within said trailing face.

6. A lumber inspection device as claimed in claim 1, wherein said lumber transport means comprises a chain-driven linear transport means, having a series of board engagement means mounted to and extending from the chain at regular intervals along said chain, said board engagement means comprising an elongate member having a generally concave forward face having a lower portion sloping upwardly with a relatively shallow angle and merging with a generally vertical upper portion, said forward face adapted to cooperate with the board rotation means, to allow each board engaged by the engagement means to be rotated by 180 degrees.

7. A lumber inspection device as claimed in claim 1 wherein said scanning means are adapted to scan an upper and a lateral face of each board.

8. A lumber inspection device as claimed in claim 1, wherein said scanning means comprise individual scanning means positioned forwardly and rearwardly of said board rotation means, and adapted to sequentially scan all four longitudinal faces of each board.

9. A lumber inspection device as claimed in claim 1, wherein said scanning means comprises an integral unit housed within a case and is adapted to recognize surface defects on said boards and conduct thresholding analysis thereon, to resolve the size, shape and surface location of each surface defect having a size greater than a predetermined minimum.

10. A lumber inspection device as claimed in claim 9 wherein said signal processing means is further adapted to resolve and identify the cross sectional dimensions of the board.

11. A lumber inspection device as claimed in claim 9, wherein said signal processing means is adapted to generate a signal indicating the position within the board of the segment resolved thereby.

12. A lumber inspection device as claimed in claim 9, wherein said signal processing means is further adapted to compare said surface defects with a defect size and type restriction imposed by predetermined grading rules and to assess a grade for the segment of board resolved thereby.

13. A lumber inspection device as claimed in claim 1, wherein there is further provided a host control means, adapted to receive data transmitted by said signal processing means, and to assess an optimum trim for each board and a said lumber grade.

14. A lumber inspection device as claimed in claim 13 wherein said host control means is adapted to transmit information relating to said optimum trim and said resulting grade to any combination of trim saws, stampers or sorters adapted to receive said information and process each board in accordance with said transmitted information.

15. A scanning means for assembly within a lumber inspection device for the inspection of a board having surface defects, said surface defects each having a size, shape and location, said scanning means comprising a housing mountable to said lumber inspection device, said housing supporting therein a light source and an area scanning unit, wherein said scanning unit comprises a lens adapted to view in a single image two adjacent faces of a discrete segment of said board comprising a portion of said board less than the entire length thereof, means to convert the image into electronic signals, and signal processing means to process said electronic signals, said signal processing means comprising means to identify the shape, location and size of said surface defects, means to perform thresholding analysis thereon, and means to transmit resulting signals to a central signal processing unit, said scanning means adapted to independently scan said discrete segment and to cooperate with other like scanning means to determine a lumber grade and optimal trim for said board.

16. A scanning means as claimed in claim 14 wherein said signal processing means is further adapted to resolve and identify the cross sectional dimensions of said board.

17. A scanning means as claimed in claim 15 wherein said signal processing means is further adapted to compare the information relating to the surface defects identified thereby, and to compare said information with predetermined grading rules, and to assess a grade for said board segment.

18. A scanning means as claimed in claims 15, 16 or 17 wherein said scanning unit is slideably engaged within said housing.

19. A scanning means as claimed in claim 18, wherein said scanning unit is engaged to said housing by means of a rail extending laterally from a side of said scanning unit, adapted to slideably engage a corresponding rail extending inwardly from a wall of the housing.

20. A method for inspecting lumber for surface defects, comprising the steps of positioning a board on lumber transport means, said boards each having upper, lower and side longitudinal faces and cross sectional dimensions and at least some of said boards having surface defects on said faces, said defects each having a size, shape and location, transporting said board through a frame by said transport means, scanning said upper face and a first side face of said board by means of a first optical scanning means positioned on said frame above said board, rotating said board such that its lower face faces upwardly, and scanning said lower face and a second side face of said board with a second optical scanning means positioned above said board and mounted on said frame, said first and second scanning means each adapted to scan a predetermined segment of said board, said segment having a position within said board, said first and second scanning means being adapted to receive visual information from the surface of said board and to convert the visual information received thereby into electronic signals, said signals being conveyed to signal processing means adapted to assess the position and size of surface defects on said board, to perform thresholding analysis in respect of said surface defects, to compare said surface defects with defect size, type and location rules imposed by predetermined grading rules, and to indicate a grade of said segment of the board and transmit said information to a central processing unit adapted to receive similar information from like scanning means and assess an overall grade and optimum trim for said board.

21. A method as claimed in claim 20, wherein said scanning means are positioned forwardly and rearwardly of said board rotation means, and are adapted to sequentially scan all four longitudinal faces of each board.

22. A method as claimed in claim 20, wherein said signal processing means are integral with said scanning means.

23. A method as claimed in claim 20, comprising the further step of generating a signal by means of said signal processing means to indicate the position within the board of the segment scanned by said scanning means.

24. A method as claimed in claim 20, comprising a further step of determining the cross-sectional dimensions of said board by means of said scanning means.

25. A method as claimed in claim 20, comprising a further step of transmitting signals from said signal processing means to a host control means, adapted to receive data transmitted by said signal processing means and to assess an optimum trim for each board and said grade thereof.

26. A method as claimed in claim 25 comprising a further step of transmitting signals generated by said host control means indicating grading and trim information relating to said board to any combination of trim saws, stampers or sorters adapted to receive said information and process said board in accordance with said transmitted information.

* * * * *